(12) United States Patent
Kahne

(10) Patent No.: US 8,972,785 B2
(45) Date of Patent: Mar. 3, 2015

(54) CLASSIFYING PROCESSOR TESTCASES

(75) Inventor: Brian C. Kahne, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 307 days.

(21) Appl. No.: 13/549,040

(22) Filed: Jul. 13, 2012

(65) Prior Publication Data
US 2014/0019806 A1 Jan. 16, 2014

(51) Int. Cl.
*G06F 11/00* (2006.01)
(52) U.S. Cl.
USPC .............................. 714/33; 714/741; 716/106
(58) Field of Classification Search
None
See application file for complete search history.

(56) References Cited

U.S. PATENT DOCUMENTS

| | | | | |
|---|---|---|---|---|
| 5,629,878 | A * | 5/1997 | Kobrosly | 702/120 |
| 5,892,947 | A * | 4/1999 | DeLong et al. | 717/100 |
| 6,141,630 | A * | 10/2000 | McNamara et al. | 703/14 |
| 6,304,837 | B1 * | 10/2001 | Geiger et al. | 703/14 |
| 6,560,721 | B1 * | 5/2003 | Boardman et al. | 714/33 |
| 6,647,513 | B1 | 11/2003 | Hekmatpour | |
| 7,240,243 | B2 | 7/2007 | Decker | |
| 7,904,270 | B2 | 3/2011 | Bohizic et al. | |
| 2004/0260516 | A1 * | 12/2004 | Czerwonka | 702/186 |
| 2005/0149805 | A1 * | 7/2005 | Syed et al. | 714/741 |
| 2005/0166114 | A1 * | 7/2005 | Buckley | 714/738 |
| 2005/0261859 | A1 * | 11/2005 | Petsinger | 702/120 |
| 2011/0061035 | A1 * | 3/2011 | Oishi et al. | 716/106 |
| 2013/0239092 | A1 * | 9/2013 | Wieczorek et al. | 717/126 |

OTHER PUBLICATIONS

Mishra, Prabhat and Dutt, Nikil, Automatic Functional Test Program Generation for Pipelined Processors using Model Checking, Architectures and Compilers for Embedded Systems, University of California, Irvine, CA, 2002, 5 pgs., IEEE #0-7803-7655-2.
Shen, Haihua, Ma, Lin, and Zhang, Heng, CRPG: A Configurable Random Test-Program Generator for Microprocessors, Institute of Computing Technology, Beijing, China, 2005, 4 pgs., IEEE #0-7803-8834-8.
Burch, Jerry R. and Dill, David L., Automatic Verification of Pipelined Microprocessor Control, Computer Science Department, Stanford University, Conference on Computer-Aided Verification, Jun. 21-23, 1994, 17 pgs.
Adir, Allon et al., Genesys-Pro: Innovations in Test Program Generation for Functional Processor Verification, IEEE Design & Test of Computers, vol. 21, Issue 2, Mar.-Apr. 2004, 10 pgs., IBM Research Lab, Haifa University Campus, Haifa, Israel, IEEE #0740-7475.

* cited by examiner

*Primary Examiner* — Gabriel Chu

(57) ABSTRACT

Embodiments of a testcase checker system are disclosed herein. Embodiments of a testcase checker system may include an instruction set simulator configured to simulate execution of instructions of a testcase on a microprocessor using a reference model associated with an architecture of the microprocessor. The instruction set simulator may generate logging data associated with the each instruction based on the simulated execution of that instruction. The testcase checker system may also include checker module comprising a set of rules. Each of these rules may be associated with a boundedly undefined condition. The checker module is configured to receive the logging data associated with an instruction from the instruction set simulator and process the logging data based on the rules to determine if any of the rules are violated.

20 Claims, 5 Drawing Sheets

CLASSIFYING PROCESSOR TESTCASES

FIELD

This disclosure relates generally to evaluating processor testcases.

BACKGROUND

Today's microprocessors have grown significantly in complexity and functionality. Different techniques are deployed to verify that the microprocessors function correctly. One technique may involve creating architectural tests cases and running the testcases on the microprocessors. In many cases there may be many thousands of such testcases. However, certain testcases may be bad or invalid due to subtle issues or bugs. Finding and filtering invalid testcases via manual debugging may take significant time and effort for a verification team.

BRIEF DESCRIPTION OF THE DRAWINGS

Present example embodiments are illustrated by way of example and are not limited by the accompanying figures, in which like references indicate similar elements. Elements in the figures are illustrated for simplicity and clarity and have not necessarily been drawn to scale.

DETAILED DESCRIPTION

Figure 1:
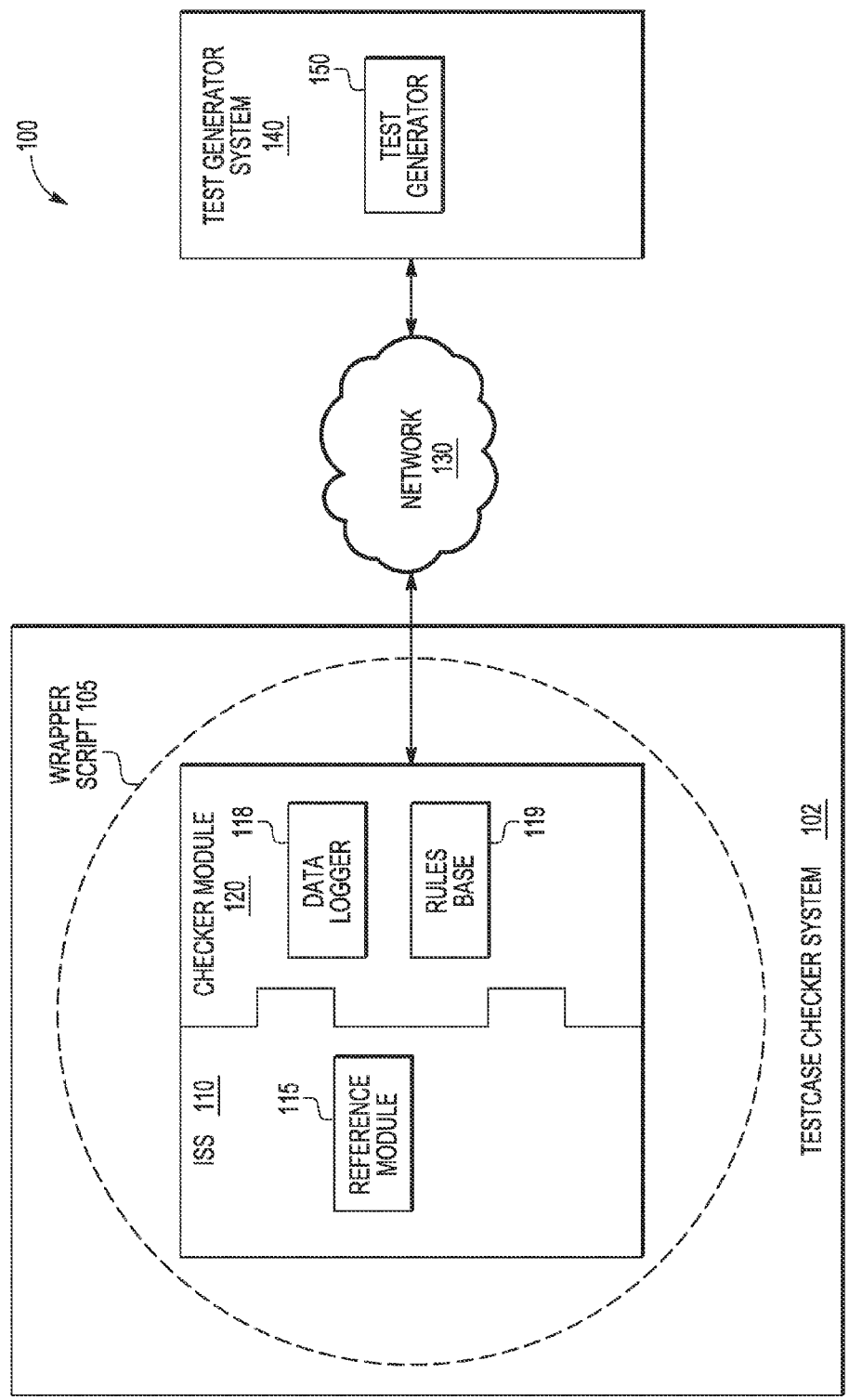
FIG. 1 illustrates one embodiment of a classification system for classifying testcases.

During the verification process of a microprocessor a testcase generator may generate unique programs or testcases to verify correct functionality of a microprocessor. The execution of the testcases on the microprocessor may then be simulated to test the validity of that microprocessor's architecture. However, the testcases may be invalid due to bugs within the testcase generator which may produce testcases that contain instructions that produce results that are boundedly undefined.

The results of executing a given instruction or sequence of instructions (collectively referred to herein as a sequence of instructions) on a microprocessor are said to be boundedly undefined if the results could have been achieved by executing an arbitrary sequence of instructions on the microprocessor starting in a state the microprocessor was in before executing the given instruction. If the results of a sequence of instructions are boundedly undefined the results of the execution of the sequence of instructions may vary when executed on a particular implementation of the microprocessor architecture or between different executions of the sequence of instructions on the same implementation of the microprocessor architecture. For example, a sequence of instructions that contains implicit branches, may produce boundedly undefined results. Such a sequence of instructions may include instructions which are not normally defined as changing the control flow, but which may nevertheless in certain circumstances, produce boundedly undefined results when executed. These boundedly undefined results may result in a change in control flow occurring at some point during execution of subsequent instructions, where the occurrence of the change in control flow is not well defined.

Accordingly, the detection of boundedly undefined conditions in testcases may be difficult as, functionally, the results of the execution of such sequences of instructions may be correct. Thus, when the execution of testcases with such boundedly undefined sequences of instructions is simulated on a functional model such as a typical instruction set simulator the results may appear correct and thus the testcase may be deemed valid. These testcases may then be utilized during a point in the verification cycle when register-transfer level (RTL) simulation occurs. As the RTL simulator may simulate a particular microarchitectural implementation of the microprocessor architecture, testcases which contain boundedly undefined conditions may cause failures of other errors at this point.

Leaving such testcases undetected is problematic for a variety of reasons, including the consumption of both computer and human resources and time. However, the detection of such testcases in a non-trivial problem, as an example manual debugging efforts may take a significant amount of time and effort.

Previous attempts at automated detection have also proved problematic. These attempts to filter boundedly undefined testcases utilized simple scanner scripts to scan individual lines of the text of a testcase to detect invalid testcases. However, these previous methods of detection do not account for the microarchitectural effects of the sequence of instructions of the testcase and were thus not capable of detecting testcases with sequences of instructions that may produce results that are boundedly undefined. This may be due to fact that the scanner scripts are simple and lack the knowledge of instruction behavior contained by a full reference model. Attempting to add this information to scanner scripts may duplicate the information already contained within the reference model, resulting in wasteful duplication of effort to maintain both the scanner scripts and the reference model.

In order to efficiently and reliably detect testcases with boundedly undefined conditions (referred to herein as invalid testcases), embodiments described herein provide a testcase checker system configured to classify testcases based upon whether they contain boundedly-undefined instruction sequences.

Embodiments of a testcase checker system may be configured to simulate the execution of a testcase on a microprocessor using a reference model describing the microprocessor's architecture, determine logging data associated with actions performed during the simulation and detect invalid testcases based on the logging data and a set of rules associated with microprocessor effects, including rules associated with microarchitectural effects that may produce boundedly undefined results. These effects may not be obvious from a functional view of the execution of the testcases on the microprocessor architecture. Yet, based on the logging data and the set of rules, the testcase checker system may be able to determine if a sequence of instructions would produce boundedly undefined results. Therefore, by utilizing the logging data and the rules, invalid testcases may be more efficiently detected, such that these testcases may be discarded or corrected, or another action taken. The detection of these testcases in this manner may thus save human resource, computing resources or both.

To this end, example embodiments provide for a testcase checker system including an instruction set simulator (ISS) reference model, and a checker module that may be configured as a standalone device or apparatus that can be used with multiple input sources to check a plurality of microprocessors' architecture.

The ISS may be configured to simulate execution of a generated testcase and return logging data on state changes, including resource usage and register state changes, on an instruction-by-instruction basis. The returned logging data may then be communicated to a checker module. The checker module may implement various rules which may be used to process the received logging data during the course of the simulation to identify potentially boundedly undefined conditions in the testcase (i.e. a set of instructions in the testcases which may produce a boundedly undefined result).

At the end of the simulation, the testcase checker system may be able to report on whether any boundedly-undefined conditions exist, and if any what type(s) of conditions were found for the simulated testcases. Accordingly, embodiments allow for detecting microarchitectural effects of the instructions of a testcase utilizing a functional simulation and are not limited to analysis of instructions themselves. Thus, microarchitectural effects can be detected in a testcase without a pipeline model or RTL simulations. Specifically, a pipeline-aware simulation is not required for detection of invalid testcases and a reference model itself does not need to provide the microarchitectural effects of the sequence of instructions of a testcase. Rather, functional effects of the simulated execution of test cases may be used to determine the microarchitectural effects. These capabilities may reduce verification time by reducing wasted efforts on simulation failure analysis while simultaneously reducing the resource burden required for the detection such invalid testcases.

FIG. 1 depicts a block diagram illustrating classification system 100 for classifying testcases for a microprocessor. Classification system 100 may include testcase checker system 102 and test generator system 140 that may communicate over network 130 which may be an electronic communication network such as the Internet, an intranet, an internet, a LAN, a WAN or another type of network.

Test generator system 140 may be a computer or processor including test generator 150. Test generator 150 may be configured to generate testcases. The testcases may be a set of instructions and data associated with a microprocessor's architecture. More specifically, a testcase may be a text file or program including an initial state, instruction sequences and final results. The initial state may include values for a memory, register, or cache value, the sequence of instructions may be memory initializations or translations, and a final result may lists the values of the memory, registers or cache. The execution of such a testcase may thus be simulated in accordance with the microprocessor architecture with which it is associated by simulating execution of the sequence of instructions of the testcase.

Testcase checker system 102 is a system configured to classify testcases for microprocessor architecture and may include wrapper 105. Wrapper 105 is configured to cause a testcase to be checked according to utilizing a reference module 115 within an instruction set simulator (ISS) 110 and checker module 120. Wrapper 105 may also be configured to generate an error summary based on the output of checker module 120 classifying the testcases as valid or invalid or identifying which errors were found with respect to the testcase being checked.

In one embodiment, wrapper 105 is a program such as a script or the like that invokes ISS 110 with command line parameters including the testcase to be checked, and processes the output of the checker module 120 to see if the testcase is invalid or valid or the types of errors detected including a summary of errors. It will be noted here, that while the embodiment depicted includes wrapper 105 other embodiments of a testcase checker system may not include such a wrapper and may function with equally efficacy. In such cases, for example, the ISS 110 may be invoked manually or the output of the checker module 120 manually processed.

Instruction set simulator (ISS) 110 may be a functional reference model configured to simulate the behavior of a microprocessor and return state changes after each simulated instruction. ISS 110 may thus be configured to simulate execution of the instructions of a testcase and output logging data that includes a visible architectural state of the processor during or after the simulated execution of each instruction. ISS 110 may include reference module 115. Reference module 115 may be configured to simulate the execution of instructions for a particular microprocessor including the simulation of any address translation, memory read or writes, instruction decoding, and updates to the architectural state of the particular microprocessor. The reference model 115 may thus, given a sequence of bytes representing an instruction, convert the sequence of bytes into simulated effects based on the documented architecture of the microprocessor. Thus, in certain embodiments, reference module 115 may be an untimed functional simulator for generated testcases written for example, in an architecture description language. In other embodiments, ISS 110 may be written in a high level programming language such as C or C++.

Checker module 120 may be a plug-in module communicatively coupled with ISS 110. Checker module 120 may also be configured to receive the logging data associated with the simulated state of the microprocessor output by reference module 115 during the simulated execution of a testcase. Rules base 119 may store a set of rules to evaluate empirically the logging data received from the reference model 115 to identify boundedly undefined conditions. These rules may include sequential rules that evaluate logging data that results from the simulated execution of multiple instructions in sequence or multiple sequential actions associated with the same instructions. A sequential rule may cause data associated with the rule to be stored as logged data 118. This data may include, without limitation, register accesses, addresses, type of instruction executed, endianness of addresses, etc. associated with the execution of one instruction. The rule can then utilize the logged data 118, and logging data received from the reference model 115 that resulted from the simulated execution of a subsequent instruction, to determine if a boundedly undefined condition associated with that rule has been detected. Rules base 119 may include or utilize one or more libraries that help with storing logging data 118 such as, for example, an interval arithmetic library such as the Boost Interval Arithmetic Library.

Therefore, the checker module 120 utilizes state changes to detect if any of the rule(s) of rules base 119 are violated. If so, a testcase may be detected as invalid and the checker module 120 may generate an error output file indicating the testcase is invalid and an identification of which rule(s) of the rules base 119 was violated.

To check testcases using a testcase checker system 102, once a testcase is generated by testcase generator 150, the testcase may be communicated to testcase checker system 120 via network 130. Reference module 115 may then simulate the execution of the testcase to generate the logging information associated with sequential state changes of the microprocessor associated with the reference module 115. As the testcase is being simulated, reference module 115 may communicate the logging information associated with the state changes to checker module 120 for every instruction being simulated.

During the simulated execution of the testcase by the reference module 115 the checker module 120 may receive the logging data, the rules of the rules base 119 may be used to process the received logging data to determine if a rule has been violated. For example, data associated with a sequential rule may be stored in logged data 118 and based on logging data associated with a subsequent instruction of a sequence of instructions it can be determined if a condition has been met to determine if the sequential rule has been violated. If one or more of the rules of the rules base 119 have been violated, checker module 120 may indicate each rule that has been violated and indicate the testcase as invalid. One the other hand, if none of the set or rules has been violated, then checker module 120 may indicate the testcase as a valid testcase.

It will be noted that while in certain embodiments, checker module 120 may evaluate the rules of the rules base 119 during the simulated execution of a testcase as the logging data is being received, in another embodiment, checker module 120 may receive the logging data after an entire testcase has been simulated, and then determine if the logging data for the testcase violates any of the rules of the rules base 119.

Figure 2:
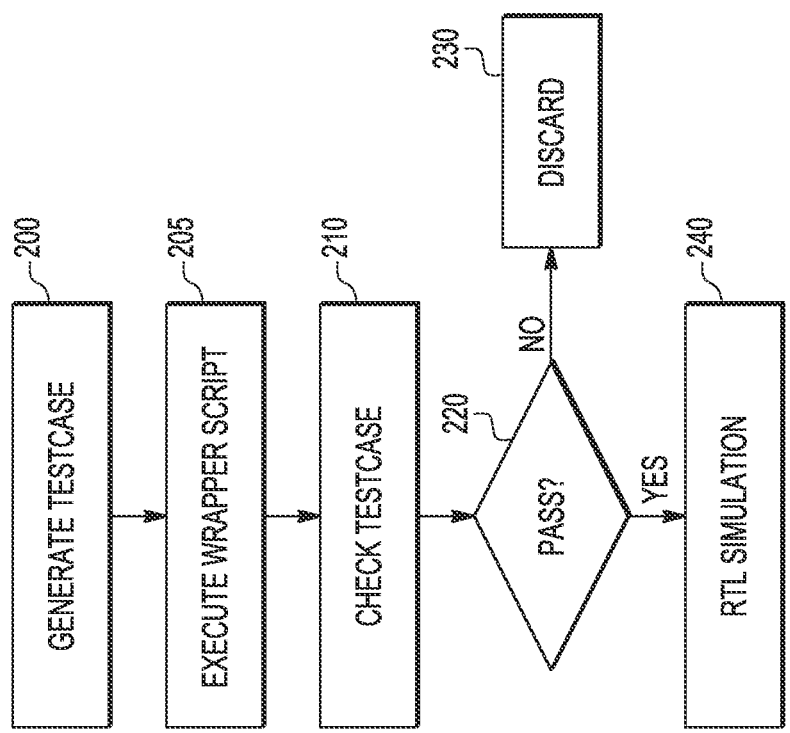
FIG. 2 illustrates one embodiment of a method for classifying testcases.

Moving now to FIG. 2, one embodiment of a method of classifying testcases is depicted. Initially at step 200, a testcase including an initial state, instructions, and final results may be generated. At step 205, a wrapper script configured for use with an instruction set simulator and a checker module may be executed. As one skilled in the art will appreciate the wrapper script may be obtained by any known means, and may be configured for use with a plurality of instruction set simulators and/or a plurality of checker modules with multiple checks.

At step 210, the testcase may be checked. In one embodiment, the wrapper script may invoke the instruction set simulator on the testcase to be checked with appropriate arguments and configuring the ISS to load the checker module. The execution of the testcase may then be simulated using the reference module of the ISS to determine, on an instruction by instruction basis, logging data indicating the instructions simulated and associated data indicating architectural state changes. The logging data may be processed during the simulated execution of using a set of rules to determine if any rules are violated. The set of rules may be associated with boundedly undefined conditions that may arise from microarchitectural effects associated with microarchitectural features of the microprocessor being simulated by the reference model, such as the pipeline of the microprocessor or the like. These rules may include sequential rules that evaluate logging data that results from the simulated execution of multiple instructions in sequence or multiple sequential actions associated with the same instructions to determine if a rule has been violated by the execution of a sequence of instructions. The checker module may then generate an output file comprising data on whether the rules have been violated.

At step 220, it may be determined if the testcase violates any of the set of rules. This determination may be made, for example, by utilizing the wrapper script to parse the output file of the checker module. If the testcase violates any of the set of rules the testcase may be discarded in step 230 or manually debugged. On the other hand, if the testcase did not violate any of the set of rules, the testcase may pass and be executed on a RTL simulation of the microprocessor at step 240.

Figure 3:
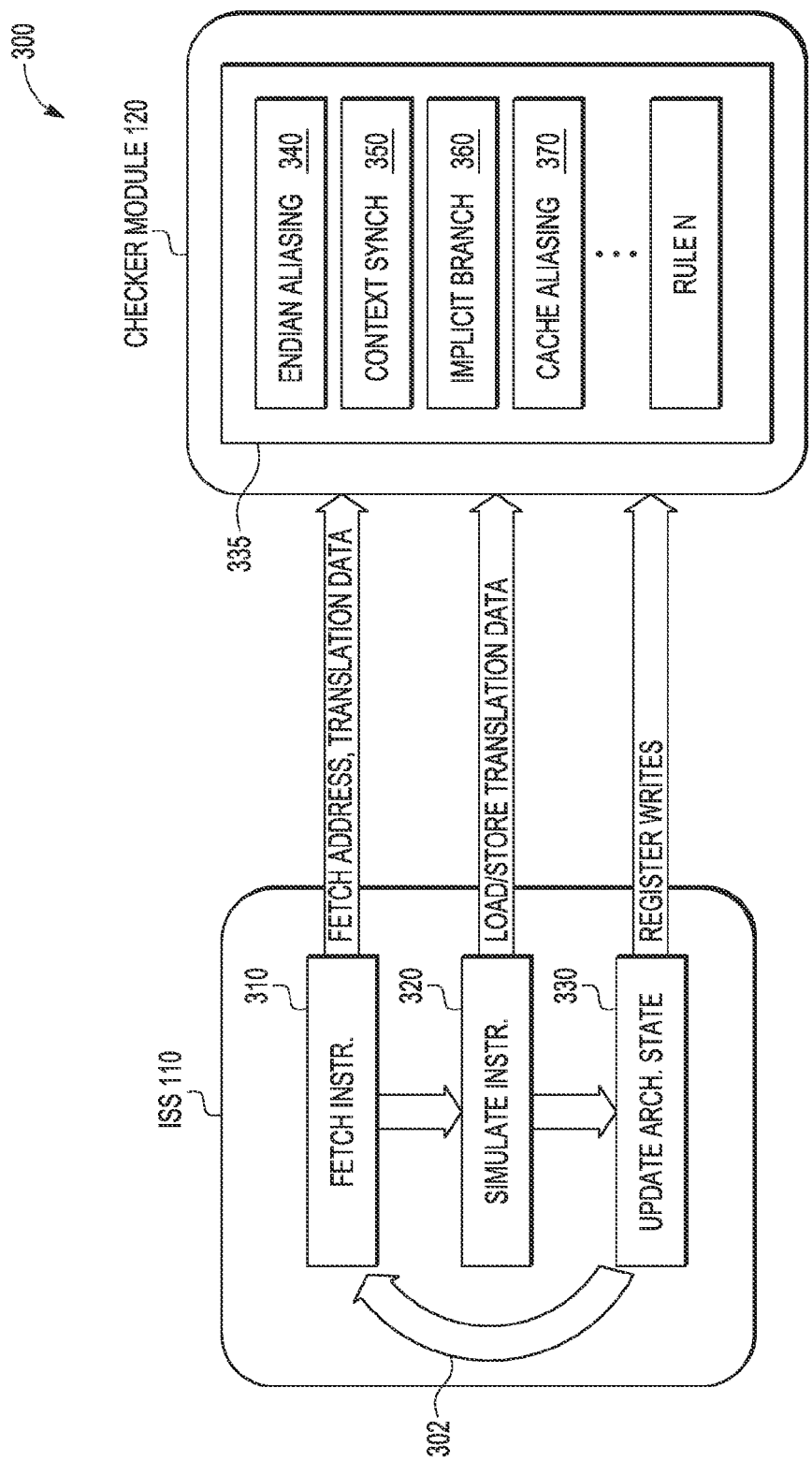
FIG. 3 illustrates one embodiment of an instruction set simulator and a checker module.

It may now be helpful to delve into more detail regarding the ISS and the checker module. FIG. 3 depicts an embodiment of ISS 110 and checker module 120. As discussed above ISS 110 may transmit logging data to checker module 120. More specifically, ISS 110 may simulate execution of a testcase on a particular microprocessor by simulating the execution of each instruction of the testcase. The execution of an instruction of a testcase may comprise the steps of fetching an instruction of the testcase (block 310), simulating execution of the instruction (block 320) using the reference model describing the architecture of the microprocessor and updating an architectural state of the microprocessor being simulated (block 330). The next instruction of the testcase can then be fetched (block 302).

At each step during of the simulated execution of an instruction ISS 110 may determine associated logging data and communicate this logging data to checker module 120. In particular, in one embodiment after each fetching the instruction (block 310), ISS 110 may communicate the fetch address and associated translation data (e.g. associated with the translation of a virtual address to a physical address, etc.) to checker module 120. A fetch address may be associated with an address where an instruction is located, and translation data may be associated with attributes corresponding to translating an address between a physical address and a virtual address. For example, in some microprocessors' architecture, attributes that may be associated with how memory within the microprocessor architecture may be determined. In one embodiment, the attribute may correspond with how memory is accessed and may be cache inhibited meaning that any memory is not accessed via a cache. Other attributes associated with such a translation may include, for example, memory coherency data.

After simulating execution of the instruction (block 320) ISS 110 may communicate load/store translation data to checker module 120, and after updating an architectural state of the microprocessor (block 330) ISS 110 may communicate the registers accessed and register write values to checker module 320.

Checker module 120 may include a rules base that includes a set of microarchitectural rules 335. The microarchitectural rules 335 are configured to detect sequences of instructions whose results may appear functionally correct but that may nevertheless have microarchitectural effects that result in boundedly undefined conditions for a particular microprocessor architecture. Checker module 120 may process logging data resulting from multiple instructions executed sequentially (where there may be one or more intervening instructions executed in addition) using microarchitectural rules 335. In one embodiment, these microarchitectural rules define a combination of logging data or instructions that indicate a boundedly undefined condition and may include endianness aliasing rule 340, context synchronizing rule 350, implicit branching rule 360 and cache aliasing rule 370. Other rules are of course possible and are fully contemplated within the scope of this disclosure.

Endianness aliasing rule 340 may be a rule associated with endianness aliasing for a fetch address. Such a rule 340 may verify that no aliasing of effective addresses occurs with translations of different endianness. Checker module 120 may receive logging data from ISS 110 associated with a translation as they occur (for example, a memory mapped unit translation for a fetch). This logging data may include the endianness of the address being fetched. Checker module 120 may check each instruction translation against a stored set of addresses including a set of addresses in a big-endian set and a little endian set. This stored set of addresses may have been logged based on the logging data received in association with the simulated execution of previous instructions.

If the translation includes an address that is little-endian, then checker module 120 may verify that there is no overlap of the real address with addresses in the big-endian set. If there is no overlap of the real address with addresses in the big-endian set, then a fetch address associated with the testcase may pass rule 340, however if there is an overlap of the real address with addresses in the big-endian set, then a fetch address associated with the testcase may fail rule 340, indicating a boundedly undefined condition.

If the translation includes an address that is big-endian, then checker module 120 may verify that there is no overlap of the real address with addresses in the little-endian set. If there is no overlap of the real address with addresses in the little endian set, then a fetch address associated with the testcase may pass rule 340, however if there is an overlap of the real address with address in the little endian set, then a fetch address associated with the testcase may fail rule 340, indicating a boundedly undefined testcase. As each fetch address is received data and instruction translations may be added to the stored set of addresses update the set, since aliasing across instruction/data translations may occur.

Another rule within the set of rules 335 may be context synchronizing rule 350. Context synchronizing rule 350 may be a rule for context-synchronizing instructions before memory operations 350, which may verify that, after a context change, there is a context-synchronizing instruction (CSI) before any memory operations occur. As logging data is received at checker module 120 from ISS 110, checker module 120 may check if a context change occurred. This context change may be, for example, a write to a logical partition ID register (LPIDR) or process identification (PID0) registers, or access to context-changing bits in a machine state register (MSR). If checker module 120 determines that an exception for a CSI rule 350 subsequently occurs before any memory operations, then checker module 120 may determine that a CSI has occurred and thus context synchronization rule 250 may not be violated in that instance. If checker module 120 determines that a return-from-interrupt (RFI) instruction or isync instruction occurs, then checker module 120 may determine that this is a CSI (fetch) and thus context synchronization rule 350 may not be violated in that instance. If however, a memory operation (load, store, instruction-cache, or data-cache instruction) occurs and no CSI has occurred, then context synchronization rule 350 may be violated indicating a boundedly undefined condition.

Checker module 120 may also utilize implicit branching rule 360 to process the logging data received from the ISS 110. Using the implicit branching rule 360, checker module 120 may check to make sure that any implicit branch (an instruction which changes the flow of control in the processor without being an explicit branch operation) is followed immediately by an instruction pipeline synchronization instruction such as an isync instruction or the like. If the implicit branch instruction is not followed immediately by an isync instruction checker module may determine that implicit branching rule 360 has been violated.

Thus, using implicit branching rule 360, as logging data is received at checker module 120 from ISS 110, checker module 120 may determine if an instruction is either a move-to machine state register (MTMSR) or move to special-purpose register (MTSPR) instruction (fetch). Subsequently, check module 120 may determine if a context change occurred such as a write to LPIDR or PID0 registers, or a write to context-changing bits in the MSR register. Then, checker module 120 may determine if no instruction access exception (is or gis) occurred, and if the next instruction read is from a non-consecutive address from prior instruction (fetch). If the next instruction is from a non-consecutive address and is not followed immediately by an isync instruction, then checker module 120 may determine that implicit branch rule 360 has been violated.

Checker module 120 may also utilize a cache aliasing rule 370 to determine if aliasing of effective addresses occurs with translations of different cache-inhibited settings. As logging data is received at checker module 120 from ISS 110, checker module 120 may check each instruction and associated translation and data, and if the translation, instruction or data is a cache-inhibited translation then checker module 120 may verify that it does not overlap with any non-cache-inhibited translations in a set of translations with the same real address. These translations may be stored in association with cache aliasing rule 370 when logged data on translations is received at checker module 120. If the cache-inhibited translation does overlap with any non-cache-inhibited translations with the same real address then checker module 120 may determine that cache aliasing rule 370 has been violated. If the translation, instruction or data is a non-cache-inhibited translation then checker module 120 may verify that it does not overlap with any cache-inhibited translations in a set of translations with the same real address. If the non-cache-inhibited translation does overlap with any cache-inhibited translations with the same real address then checker module 120 may determine that cache aliasing rule 370 has been violated.

Using the set of rules 335 then, the checker module 120 may thus receive logging data from ISS 110, and process the logging data according to the set of rules 335 to detect microarchitectural effects caused by a sequence of instructions that may indicate a boundedly undefined condition.

Figure 4:
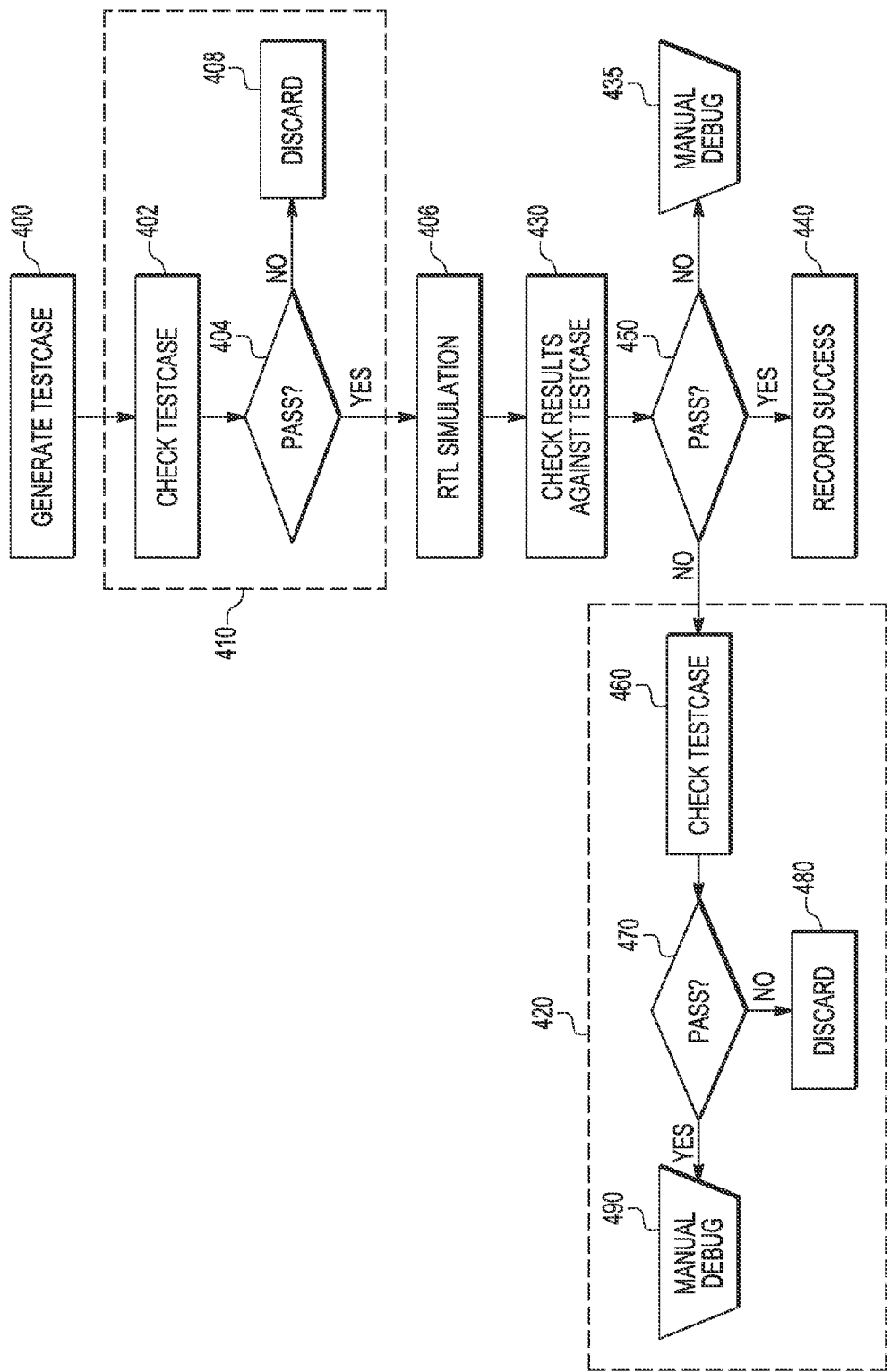
FIG. 4 illustrates one embodiment of a method of checking a testcase.

Turning now to FIG. 4, a flow diagram depicting a method for checking a testcase is depicted. In one embodiment, a testcase may be checked before an RTL simulation (block 410) or after the RTL simulation (block 420).

A testcase may be generated at step 400. In one embodiment, as depicted in block 410, the testcase is checked before running an RTL simulation. Thus, the testcase is checked at step 402 and a determination can be made if the testcases passes at step 404 by determining if any rules have been violated. If the testcase does not pass it may be discarded at this point at step 408. If the testcase passes the testcase may be executed using a RTL simulation at step 406. Then at step 430, after a testcase has been executed on a RTL simulation, the results of the RTL simulation may be checked against the testcase. The testcase results may check to determine if there are discrepancies between the results based on the reference model for the microprocessor architecture and the RTL simulation.

At step 450, it may be determined if the results of the RTL simulation for microprocessor architecture produces a valid or passing architecture. If the RTL simulation indicates that the microprocessor architecture is valid for the testcase, the microprocessor architecture may be determined as a success step 440. However, if the RTL simulation results indicate an invalid testcase, the RTL simulation results may be checked via manual debugging step 435.

Alternatively, in one embodiment, as depicted in block 420, the testcase may be checked after running an RTL simulation at step 406. In such cases it will be noted that the testcase may not be checked before an RTL simulation (block 410). Thus, in this embodiment, if the RTL simulation results indicate an invalid testcase at step 460, the testcase may be checked.

At step 470, it may be determined if the testcase violates any of the set of rules. If the testcase violated any of the set of rules the testcase may be discarded at step 480, and it may be indicated which rules were violated. On the other hand, if the testcase did not violate any of the set of rules, the testcase may pass and the results of the RTL simulation may be manually debugged at step 490 if desired.

It may be desired for a testcase to be checked before running an RTL simulation (block 410) or after running an RTL simulation (block 420) for reasons having to do with efficiency and ease for tooling. For example, it may be easier to determine if a testcase includes boundedly undefined characteristics before simulating a testcase so that there are no RTL simulations being executed for bad testcases. On the other hand, it may be beneficial to check testcases after executing an RTL simulation 420 so that invalid testcases and results for the simulations may be compared.

Figure 5:
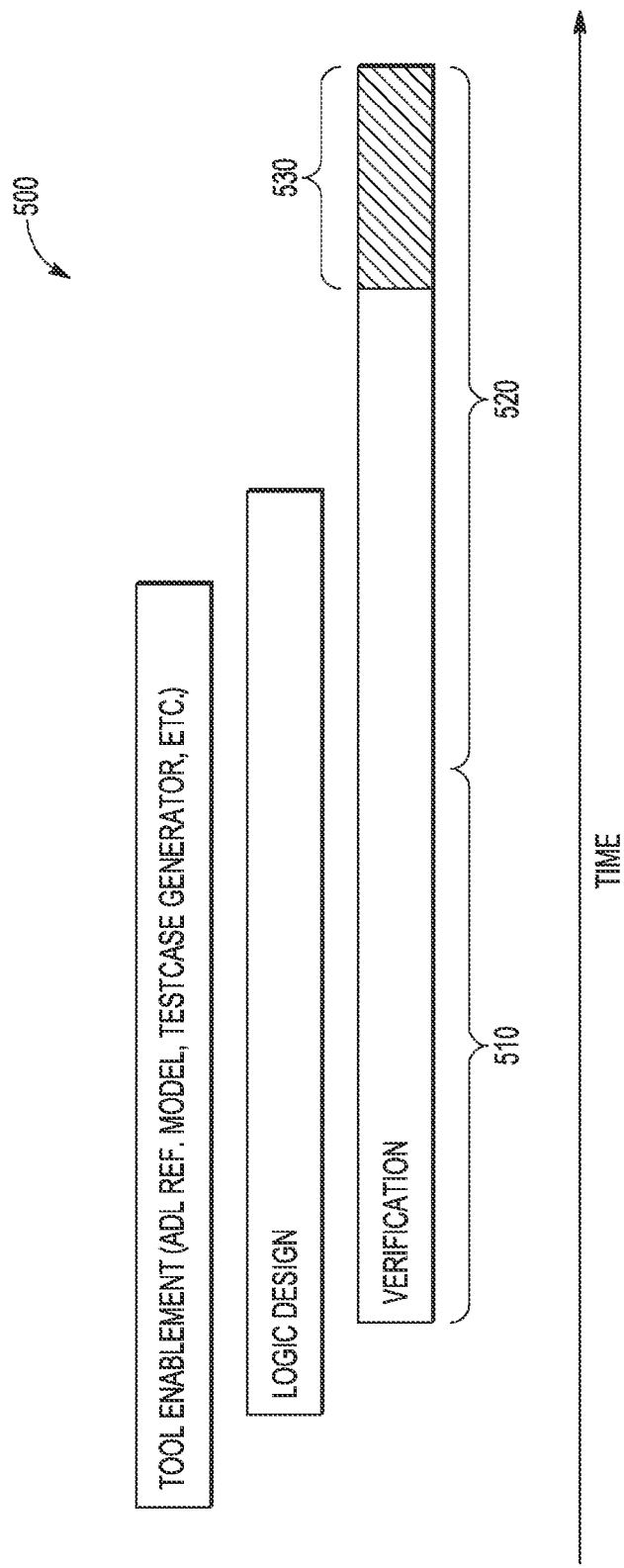
FIG. 5 illustrates embodiments of the classification of testcases at various points in the verification cycle of a microprocessor.

FIG. 5 depicts various time periods 510, 520 and 530 during a verification cycle 500 of a microprocessor where utilizing a testcase checker may be beneficial to increase productivity and/or reduce time required to verify a microprocessor's architecture.

At time period 510, at an early point in the verification cycle, it may be useful to check a testcase if the testcase generator itself is not yet stable. However, a higher rate of true RTL bugs may also be found or located if testcases are checked during this time. At time period 520, at middle point in the verification process it may be useful to check a testcase when a testcase generator is more stable and true bugs are less likely. At time period 530 at the end of a verification process, it may be useful to check a testcase to reduce a triage fail time and allowing for more verification of the microprocessor's architecture.

Embodiments as described herein may allow re-use of an existing reference model used during the entire verification process, including the generation of testcases. Thus, a separate effort for validating the ISS is not required, which may avoid duplicate effort, such as would be required if a simple scanning script were used.

Embodiments as described herein may thus offer a number of advantages. One advantage is that microarchitectural effects and boundedly undefined conditions that result from the microarchitectural details of the microprocessor, and that may appear functionally correct, may be detected using a functional model. Thus, such boundedly undefined conditions that appear functionally correct, even those conditions that may occur because of effects resulting from pipeline implementations of the like, may be detected without using a microarchitectural simulator such as a pipeline simulator.

Moreover, embodiments as described may detect these microarchitectural effects and boundedly undefined conditions that occur with respect to a sequence of instructions. Thus, data generated in accordance with multiple instructions executed in a sequence may be utilized to detect microarchitecutal effects and boundedly undefined conditions that result specifically because certain instructions or types of instructions have executed in particular sequence.

Additionally, embodiments herein may use "white-box testcases" (those containing an initial state comprising more than just initial memory values, e.g. register and TLB data), such as those produced from an architectural testcase generator, but may also user testcases only containing an initial state memory state (such as those produced by a C compiler or hand-written assembly).

Embodiments are also scalable to larger tests, as they maintain a minimal amount of information during the simulation run, as opposed to post-processing systems which may scan an instruction trace produced by a simulator. Therefore, embodiments are faster in that checking is performed via a functional model, rather than requiring a simulator. Thus, computing resource usage and license usage may be minimized, and bad testcases are not required to be simulated.

As discussed, then, embodiments as described herein may provide testcase checker system with a computing device including a processor and a computer readable medium. The computer readable medium may have instructions for an instruction set simulator configured to simulate execution of instructions of a testcase on a microprocessor using a reference model (which may, for example, be a functional model) associated with an architecture of the microprocessor. The instruction set simulator may generate logging data associated with the each instruction based on the simulated execution of that instruction. The computer readable medium may also have instructions for a checker module comprising a set of rules. Each of these rules may be associated with a boundedly undefined condition. The checker module is configured to receive the logging data associated with an instruction from the instruction set simulator and process the logging data based on the rules to determine if any of the rules are violated.

Additionally, certain embodiments the checker module is configured to classify a testcase as valid or invalid if any of the set of rules are violated. In particular, in one embodiment, the checker module may be configured to receive logging data associated with a first instruction of the sequence of instructions from the instruction set simulator and store the logging data associated with the first instruction based on a first rule. The checker module may then receive logging data associated with a second instruction of the sequence of instructions that is subsequent to the first instruction and determine if the first rule is violated based on the stored logging data associated with the first instruction and the logging data associated with the second instruction.

In some embodiments, the instruction set simulator is configured to generate logging data associated with the simulated execution of an instruction during a fetch of the instruction, a simulated execution of the instruction and an update to an architectural state of the microprocessor.

In one particular embodiment, a wrapper may be utilized to invoke the instruction set simulator on the testcase.

Although example embodiments are described herein with reference to specific embodiments, various modifications and changes may be made without departing from the scope of the embodiments as set for in the claims below. Accordingly, the specification and figures are to be regarded in an illustrative rather than a restrictive sense, and all such modifications are intended to be included within the scope of the embodiments. Any benefits, advantages, or solutions to problems that are described herein with regard to specific embodiments are not intended to be construed as a critical, required, or essential feature or element of any or all the claims.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or elements or impose an alternate decomposition of functionality upon various logic blocks. Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "coupled," or in "communication" to each other to achieve the desired functionality.

Also for example, in one embodiment, the illustrated elements of system 100 may be located on a single computing device or multiple distributed or interconnected computer devices. Additionally, not all the components of system 100 are present in certain embodiments. For example, test generator may not be present in certain embodiments and in such cases, a testcase may be generated on testcase checker system 102, may be provided using a computer readable medium, may be accessed at another location by testcase checker system 102 or may be obtained in some other manner entirely.

All or some of the above-discussed embodiments or elements thereof can be implemented with software modules that perform one or more tasks associated with the embodiments, including for example, ISS 110, reference model 115 checker module 120 and rules base 119. The software modules described may include for example, computer-readable storage media, or other media on other computer systems where the memory may include the instructions for performing the tasks or functions. Such computer readable storage media may be permanently, removably or remotely coupled to a data processing system. The computer-readable storage media may include non-transitory computer readable storage media, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, and the like. Other new and various types of non-transitory computer-readable storage media may be used to store the modules discussed herein. Non-transitory computer readable storage media include all computer-readable media except for a transitory, propagating signal.

In one embodiment, system 100 or elements thereof may be a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

What is claimed is:

1. A testcase checker system, comprising:
   a processor; and
   a computer readable medium, the computer readable medium comprising instructions to be executed by the processor, the instructions include:
   an instruction set simulator configured to simulate execution of each instruction of a sequence of instructions of a testcase on a microprocessor, wherein simulating the execution of each instruction includes using a reference model associated with an architecture of the microprocessor, and to generate logging data associated with each instruction of the sequence of instructions based on the simulated execution of that instruction; and
   a checker module comprising a set of rules, wherein each rule is associated with a boundedly undefined condition and the checker module is configured to receive the logging data associated with each instruction from the instruction set simulator and to process the logging data associated with each instruction based on each rule to determine if each rule is violated.

2. The testcase checker system of claim 1, wherein the checker module is configured to classify a testcase as valid or invalid, wherein the testcase is classified as invalid if any of the set of rules are violated.

3. The testcase checker system of claim 2, wherein the instruction set simulator is configured to generate logging data associated with the simulated execution of an instruction during a fetch of the instruction, a simulated execution of the instruction and an update to an architectural state of the microprocessor.

4. The testcase checker system of claim 3, wherein the logging data includes translation data, data on a state change, data on usage of a resource, data on a register state change or a fetch address.

5. The testcase checker system of claim 2, wherein the set of rules comprise an endian aliasing rule, a context synchronization rule, an implicit branching rule and a cache inhibited aliasing rule.

6. The testcase checker system of claim 2, wherein the computer readable medium further comprises instructions for a wrapper configured to invoke the instruction set simulator on the testcase.

7. The testcase checker system of claim 2, wherein the checker module is configured to receive logging data associated with a first instruction of the sequence of instructions from the instruction set simulator and to store the logging data associated with the first instruction based on a first rule, to receive logging data associated with a second instruction of the sequence of instructions that is subsequent to the first instruction and to determine if the first rule is violated based on the stored logging data associated with the first instruction and the logging data associated with the second instruction.

8. A method for testcase classification, comprising:
   simulating, by a processor, execution of each instruction of a sequence of instructions of a testcase on a microprocessor, wherein simulating the execution of each instruction includes using a reference model associated with an architecture of the microprocessor;
   generating logging data associated with each instruction of the sequence of instructions based on the simulated execution of that instruction; and processing the logging data associated with each instruction based on each of a set of rules to determine if each rule is violated, wherein each rule is associated with a boundedly undefined condition.

9. The method of claim 8, further comprising classifying a testcase as valid or invalid, wherein the testcase is classified as invalid if any of the set of rules are violated.

10. The method of claim 9, wherein the logging data is generated in association with the simulated execution of an instruction during a fetch of the instruction, a simulated execution of the instruction and an update to an architectural state of the microprocessor.

11. The method of claim 10, wherein the logging data includes translation data, data on a state change, data on usage of a resource, data on a register state change or a fetch address.

12. The method of claim 11, wherein the set of rules comprise an endian aliasing rule, a context synchronization rule, an implicit branching rule and a cache inhibited aliasing rule.

13. The method of claim 9, further comprising invoking the instruction set simulator on the testcase with a wrapper.

14. The method of claim 9, wherein processing the logging data associated with each instruction further comprises storing logging data associated with a first instruction based on a first rule and determining if the first rule is violated based on the stored logging data associated with the first instruction and logging data associated with a second instruction of the sequence of instructions that is subsequent to the first instruction.

15. A non-transitory computer readable medium, the computer readable medium comprising instructions for:
   simulating execution of each instruction of a sequence of instructions of a testcase on a microprocessor, wherein simulating the execution of each instruction includes using a reference model associated with an architecture of the microprocessor;
   generating logging data associated with each instruction of the sequence of instructions based on the simulated execution of that instruction; and
   processing the logging data associated with each instruction based on each of a set of rules to determine if each rule is violated, wherein each rule is associated with a boundedly undefined condition.

16. The non-transitory computer readable medium of claim 15, further comprising classifying a testcase as valid or invalid, wherein the testcase is classified as invalid if any of the set of rules are violated.

17. The non-transitory computer readable medium of claim 16, wherein the logging data is generated in association with the simulated execution of an instruction during a fetch of the instruction, a simulated execution of the instruction and an update to an architectural state of the microprocessor.

18. The non-transitory computer readable medium of claim 17, wherein the logging data includes translation data, data on a state change, data on usage of a resource, data on a register state change or a fetch address.

19. The non-transitory computer readable medium of claim 16, wherein the set of rules comprise an endian aliasing rule, a context synchronization rule, an implicit branching rule and a cache inhibited aliasing rule.

20. The non-transitory computer readable medium of claim 16, wherein the computer readable medium further comprises instructions for a wrapper configured to invoke the instruction set simulator on the testcase and wherein processing the logging data associated with each instruction further comprises storing logging data associated with a first instruction based on a first rule and determining if the first rule is violated based on the stored logging data associated with the first instruction and logging data associated with a second instruction of the sequence of instructions that is subsequent to the first instruction.

* * * * *